(12) United States Patent
Mancosu et al.

(10) Patent No.: US 6,967,590 B2
(45) Date of Patent: Nov. 22, 2005

(54) DEVICE FOR CONTINUOUSLY MEASURING DEFORMATIONS IN A TIRE DURING THE TRAVEL MOVEMENT FOR A MOTOR VEHICLE

(75) Inventors: Federico Mancosu, Milan (IT); Giuseppe Matrascia, Seregno (IT)

(73) Assignee: Pirelli Pneumatici S.p.A., Milan (IT)

( * ) Notice: Subject to any disclaimer, the term of this patent is extended or adjusted under 35 U.S.C. 154(b) by 365 days.

(21) Appl. No.: 09/937,308

(22) PCT Filed: Jan. 24, 2001

(86) PCT No.: PCT/EP01/00815

§ 371 (c)(1),
(2), (4) Date: Dec. 31, 2001

(87) PCT Pub. No.: WO01/54955

PCT Pub. Date: Aug. 2, 2001

(65) Prior Publication Data

US 2003/0095050 A1   May 22, 2003

Related U.S. Application Data

(60) Provisional application No. 60/199,385, filed on Apr. 25, 2000.

(30) Foreign Application Priority Data

Jan. 25, 2000   (EP)   .................................. 00830041

(51) Int. Cl.7 .......................... G08C 19/22; H04Q 9/00
(52) U.S. Cl. ................. 340/870.07; 340/442; 340/443; 73/146.2
(58) Field of Search ...................... 340/870.01, 870.07, 340/442–448; 73/146.2, 146.4; 701/1

(56) References Cited

U.S. PATENT DOCUMENTS

| | | | |
|---|---|---|---|
| 5,087,072 A | 2/1992 | Kawarasaki | |
| 5,247,831 A | 9/1993 | Fioravanti | |
| 5,463,374 A | 10/1995 | Mendez et al. | |
| 5,502,433 A | 3/1996 | Breuer et al. | |

(Continued)

FOREIGN PATENT DOCUMENTS

DE   39 16 176   * 11/1990

(Continued)

OTHER PUBLICATIONS

U.S. Appl. No. 09/625,350 filed Jul. 25, 2000, Caretta et al.

(Continued)

*Primary Examiner*—Timothy Edwards, Jr.
(74) *Attorney, Agent, or Firm*—Finnegan, Henderson, Farabow, Garrett & Dunner, L.L.P.

(57) ABSTRACT

A device for continuously measuring deformations in a tire mounted on a rim includes at least one emitter, at least one reflecting element, and at least one optical sensor of luminous intensity. The at least one emitter and the at least one optical sensor are disposed on the rim. The at least one reflecting element is disposed on a portion of an inner surface of the tire. The at least one emitter emits a light beam toward the at least one reflecting element, the at least one reflecting element reflects the light beam toward the at least one optical sensor, and the at least one optical sensor receives the reflected light beam, measures a prechosen physical parameter associated with the reflected light beam, and provides a signal representing a deformation of the tire on the portion of the inner surface of the tire.

16 Claims, 6 Drawing Sheets

U.S. PATENT DOCUMENTS

| | | | |
|---|---|---|---|
| 5,578,984 A | 11/1996 | Nakajima | |
| 5,656,993 A | 8/1997 | Coulthard | |
| 5,731,754 A | 3/1998 | Lee, Jr. et al. | |
| 5,734,319 A | 3/1998 | Stephens et al. | |
| 5,811,672 A | 9/1998 | Mancosu et al. | |
| 5,825,286 A * | 10/1998 | Coulthard | 340/447 |
| 5,853,020 A * | 12/1998 | Widner | 137/227 |
| 5,977,870 A * | 11/1999 | Rensel et al. | 340/447 |
| 2003/0050743 A1 | 3/2003 | Caretta et al. | |
| 2003/0201881 A1 * | 10/2003 | Headley et al. | 340/443 |

FOREIGN PATENT DOCUMENTS

| | | |
|---|---|---|
| DE | 39 37 966 A1 | 5/1991 |
| EP | 0887211 * | 12/1998 |
| EP | 0689950 * | 4/1999 |
| FR | 2 584 348 | 1/1987 |
| WO | WO 93/25400 * | 12/1993 |
| WO | WO 01/11330 * | 2/2001 |
| WO | WO 01/36241 A1 | 5/2001 |

OTHER PUBLICATIONS

F. Celeri et al., "A Method for the Evaluation of the Lateral Stability of Vehicles and Tires," Society of Automotive Engineers, Inc., International Automobile Tire Conference (Oct. 22-24, 1974), pp. 1-9.*

* cited by examiner

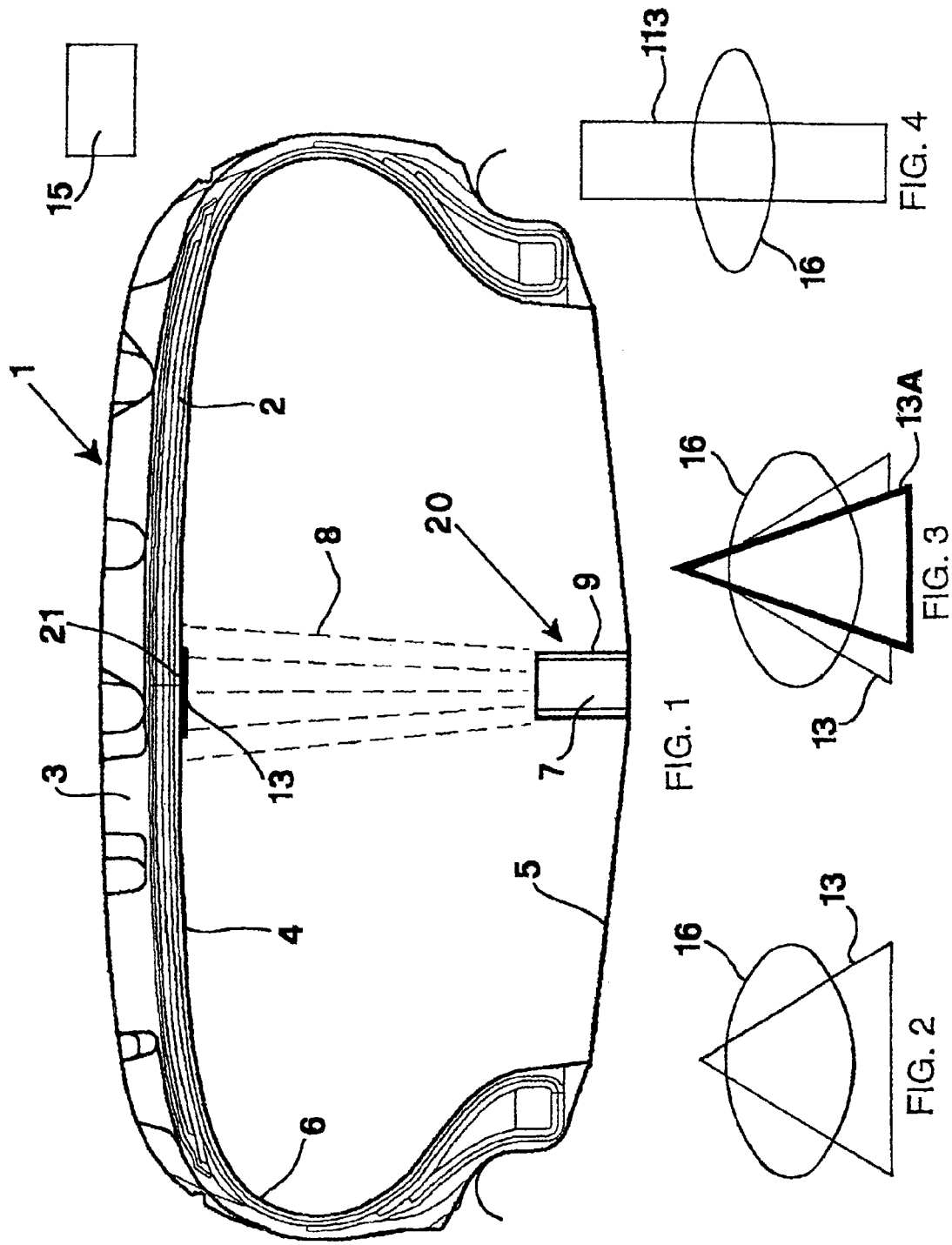

DEVICE FOR CONTINUOUSLY MEASURING DEFORMATIONS IN A TIRE DURING THE TRAVEL MOVEMENT FOR A MOTOR VEHICLE

CROSS-REFERENCES TO RELATED APPLICATIONS

This application is a national stage entry under 35 U.S.C. § 371 from International Application No. PCT/EP01/00815, filed Jan. 24, 2001, in the European Patent Office; additionally, Applicants claim the right of priority under 35 U.S.C. § 119(a)–(d) based on patent application No. 00830041.0, filed Jan. 25, 2000, in the European Patent Office; further, Applicants claim the benefit under 35 U.S.C. § 119(e) based on prior-filed, provisional application No. 60/199,385, filed Apr. 25, 2000, in the U.S. Patent and Trademark Office; the contents of all of which are relied upon and incorporated herein by reference.

BACKGROUND OF THE INVENTION

1. Field of the Invention

The present invention relates to a device for continuously measuring deformations in a tyre during the travel movement of a motor vehicle.

2. Description of the Related Art

During the travel movement of a motor vehicle, if the operating conditions of a tyre are known, it is possible to perform operations for controlling and adjusting the behaviour of the motor vehicle. In particular, it is useful to know whether there is skidding or no skidding of the tyre, the variation in the amount of grip available compared to a reference condition, the variation in the forces exchanged between tyre and road, so as to activate, for example, devices for preventing locking during braking (anti-skid or ABS devices), devices for preventing skidding during acceleration, active suspension systems, etc.

A device for controlling the behaviour of the tyre is described in European patent application No. 99830714.4 filed on 18 Nov. 1999 in the name of the same Applicants.

This device comprises one or more sensors which are situated at prechosen points on a tyre during its rolling travel and are capable of emitting signals indicating the spatial position assumed by these points. The signals for the position of a point on the tyre are used to determine the cyclical displacement thereof, namely the displacement pattern of the point during each revolution of the tyre, and from the latter the cyclical pattern of the speed is determined. Depending on the situation to be controlled, the longitudinal displacement (direction of forward travel of the tyre), transverse or lateral displacement (perpendicular to the direction of forward travel), vertical displacement of the point and the associated speed are taken into consideration.

The device performs a comparison between the cyclical pattern of the speed of the point detected during the i-th revolution and a cyclical pattern of a reference speed, in particular that detected during the i-th-1 revolution, i.e. immediately beforehand, and provides a signal indicating the instantaneous behaviour of the tyre. The sensors used in this device are associated with the tyre.

SUMMARY OF THE INVENTION

It has now been found that it is possible to obtain even better results using a device comprising at least one sensor located on a rim on which the tyre is mounted.

A first aspect of the invention relates to a device for continuously measuring deformations in a tyre, which is mounted on a rim, during the travel movement of a motor vehicle, characterized in that it comprises at least one first emitter of a first direct light beam, at least one first optical sensor of the luminous intensity and at least one first reflecting element applied to a first portion of an inner surface of said tyre, said first emitter being mounted on said rim and being capable of sending said first direct light beam towards said first reflecting element, said first optical sensor also being mounted on said rim and being capable of receiving a first reflected light beam from said first reflecting element, measuring a first prechosen physical parameter associated with said first reflected light beam and providing a signal representing the deformation affecting said tyre along said first surface portion during one revolution of said tyre.

Advantageously, said first prechosen physical parameter consists of the luminous intensity of said first reflected light beam.

Preferably, said device also comprises a second emitter of a second direct light beam, a second optical sensor of the luminous intensity and a second reflecting element applied to a second portion of the said inner surface of said tyre, situated in the vicinity of said first surface portion, said second emitter being mounted on said rim and being capable of sending said second direct light beam towards said second reflecting element, said second optical sensor also being mounted on said rim and being capable of receiving a second reflected light beam from said second reflecting element, measuring a second prechosen physical parameter associated with said second reflected light beam and providing a signal representing the variation in distance which has occurred between said second surface portion and said rim during one revolution of said tyre.

According to one embodiment, said second prechosen physical parameter consists of the luminous intensity of said second reflected light beam.

According to a variant, said second prechosen physical parameter consists of the time which lapses between sending of said second direct light beam and receiving of said second reflected light beam, said second direct light beam having a given wavelength. Advantageously, said first and second optical sensors are operationally connected to processor means capable of determining, by means of said deformation signal, a signal representing the displacement of at least one point on said first surface portion in a predetermined direction, correcting said displacement signal depending on said variation-in-distance signal and providing an output signal for displacement of said at least one point in said predetermined direction, independent of said variation in distance. Preferably, said processor means are capable of providing, by means of said variation-in-distance signal, a measurement of the vertical compression of said tyre.

A second aspect of the invention relates to a motor vehicle wheel, comprising a tyre mounted on a rim, characterized in that it comprises, in turn, a device for continuously measuring deformations in said tyre during the travel movement of said motor vehicle, said device comprising at least one first emitter of a first direct light beam, at least one first optical sensor of the luminous intensity and at least one first reflecting element applied to a first portion of an inner surface of said tyre, said first emitter being mounted on said rim and being capable of sending said first direct light beam towards said first reflecting element, said first optical sensor also being mounted on said rim and being capable of receiving a first reflected light beam from said first reflecting element, measuring a first prechosen physical parameter associated with said first reflected light beam and providing a first signal representing the deformation affecting said tyre along said first surface portion during one revolution of said tyre.

Preferably, said device of said wheel also comprises a second emitter of a second direct light beam, a second optical sensor of the luminous intensity and a second reflecting element applied to a second portion of said inner surface of said tyre, situated in the vicinity of said first surface portion, said second emitter being mounted on said rim and being capable of sending said second light beam towards said second reflecting element, said second optical sensor also being mounted on said rim and being capable of receiving a second reflected light beam from said second reflecting element, measuring a second prechosen physical parameter associated with said second reflected light beam and providing a second signal representing the variation in distance which has occurred between said second surface portion and said rim during one revolution of said tyre.

The device according to the invention has the advantage that it is safe and reliable

BRIEF DESCRIPTION OF THE DRAWINGS

Characteristic features and advantages of the invention will now be described with reference to an embodiment shown by way of a non-limiting example in the accompanying figures in which:

FIG. 1 is a cross-sectional view of a device for continuously measuring deformations in a tyre for a motor vehicle, constructed in accordance with the invention;

FIG. 2 is a front view of a reflecting element applied to an inner surface of the tyre according to FIG. 1 and a light spot associated therewith;

FIG. 3 shows the reflecting element according to FIG. 2 in the undeformed and deformed condition;

FIG. 4 shows a variant of the reflecting element according to FIG. 2;

DETAILED DESCRIPTION OF THE PREFERRED EMBODIMENTS

Figure 5:
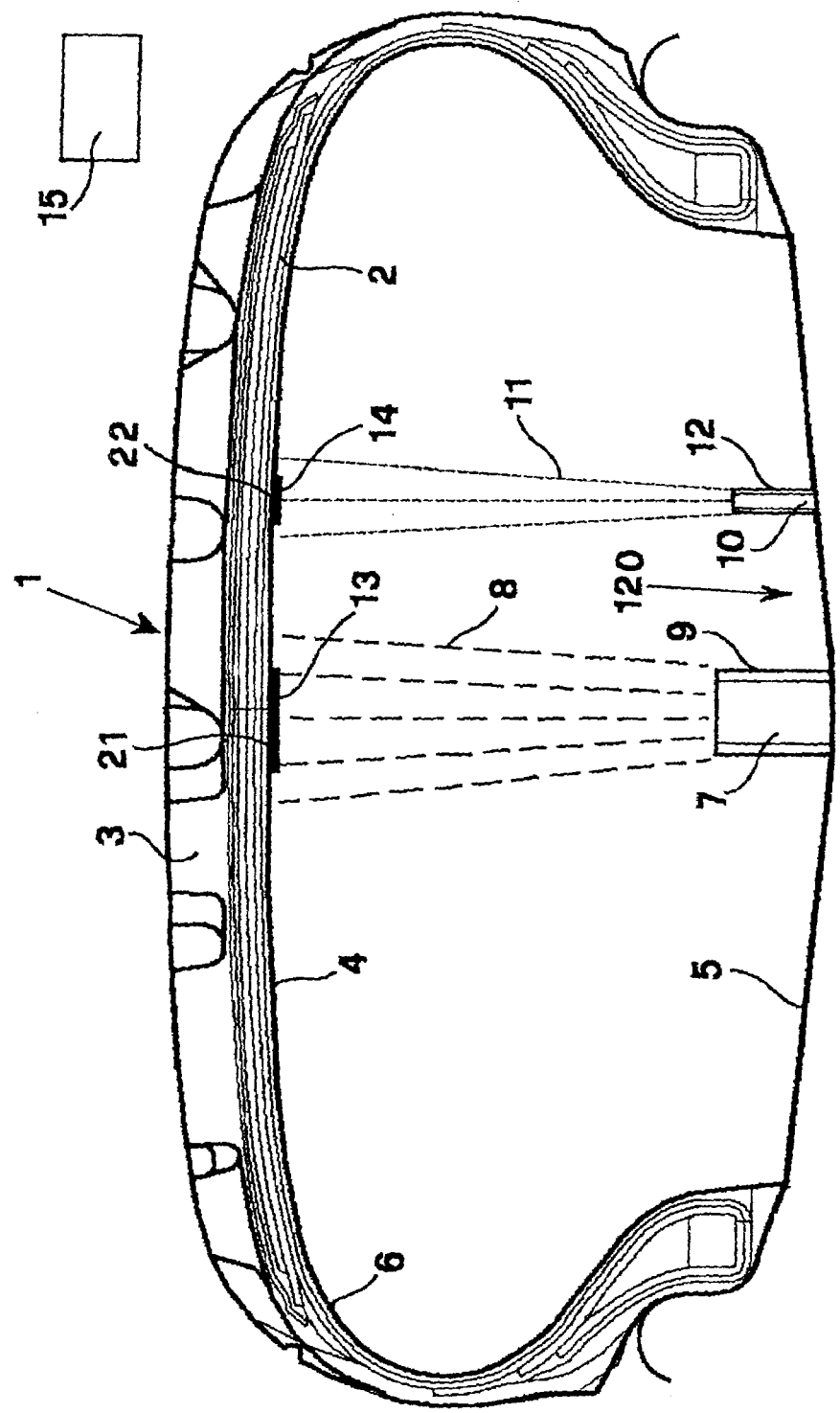
FIG. 5 shows a variant of the device according to FIG. 1.

FIG. 1 shows a tyre 1 for a motor vehicle, having a carcass 2 and a tread 3. The carcass 2 has, applied to it, a liner 6 which has an inner surface 4. The tyre 1 is mounted on a rim 5. The tyre 1 has, associated with it, a device 20 for measuring deformations, comprising an emitter 7 of a direct light beam 8 and an optical sensor 9 of the luminous intensity. The emitter 7 and the sensor 9 are fixed to the rim 5 and are operationally connected to the tyre 1.

A reflecting element 13, which is for example white coloured and in the form of an arrow (FIG. 2) or a rectangular strip 113 (FIG. 4) or a small disk, is applied onto a portion 21 of the inner surface 4 of the tyre 1, which is normally black-coloured. The reflecting element 13 is obtained, for example, by means of colouring using colouring materials having an elastic modulus similar to that of the liner 6 so as to prevent the occurrence of surface tension which could falsify the results of the measurements.

The emitter 7 and the sensor 9 are located opposite the reflecting element 13. This relative position is maintained in any rolling condition of the tyre and at any speed.

The emitter 7 emits a light beam 8 of known intensity which strikes the reflecting element 13. The optical sensor 9 measures the luminous intensity of the light beam reflected by the reflecting element 13 and emits a signal (radio waves) which is transmitted remotely to a processor, represented by a block 15. The luminous intensity of the reflected light beam may be associated with a wavelength, namely with a colour or with a wavelength band. In the first case, the sensor 9 is of the photochromatic type and the reflecting element 13 has a colour different from that of the liner. In the second case, the reflecting element 13 has a reflecting capacity which is greater than that of the surface 4.

The sensor 9 has a well-defined spot 16 (FIG. 2). "Spot" is understood as meaning the area of the surface 4 over which the sensor is able to perform its analysis. The spot has an area lying in a range of from 15 $mm^2$ to 1600 $mm^2$. The reflecting element 13 is positioned in the spot zone and the sensor 9 emits a signal proportional to the ratio between the reflecting element 13 and the total area of the spot 16.

In other words, the sensor 9 is able to analyse the colour situation on the spot surface and detect which proportion is black and which proportion consists of the colour prechosen for the reflecting element 13, for example white.

In the case where the spot has an area of 100 $mm^2$ and if the white surface area of the reflecting element is equal to 35 $mm^2$, the sensor 9 emits a proportional analog signal $35/100$ths of its scale limit value. If the scale limit value is 10 Volts (equivalent to a 100% white area with no black), the sensor emits a signal of 3.5 Volts.

The intensity of the reflected beam measured by the sensor 9 depends on the deformation of the surface portion 4 to which the reflecting element 13 is applied.

During each revolution of the tyre 1, the surface portion 4 on which the reflecting element 13 is located comes into contact with the ground and is compressed. The reflecting element 13 is deformed and its arrow or rectangular strip shape is cyclically modified, becoming broader or smaller, depending on the stress and deformation condition of the surface portion 4 lying within the spot 16 and located opposite the sensor 9. FIG. 3 shows the deformation 13a of the arrow-shaped reflecting element 13 when the tyre 1 is in a braking condition.

During rolling of the tyre, the ratio between the area of the black part and the area of the reflecting part (white) is modified in the surface portion 4 lying within the spot 16 of the sensor 9. This variation in the white/black ratio is detected by the optical sensor 9 which emits a signal which is variable over time. The cyclical signal of the white/black ratio is calculated in the processor 15 and, from this signal, on the basis of the known dimensions of the arrow or the rectangular strip of the reflecting element 13, another cyclical signal is obtained, said signal representing the pattern, over time, of the longitudinal and transverse (lateral) displacement of a point or of prechosen points forming part of the area of the reflecting element 13 which is cyclically deformed.

FIG. 5 shows a device 120 which is a variant of the device 20 shown in FIG. 1 and identical parts are indicated by the same numbers.

The device 120 comprises, in addition to the emitter 7 and the sensor 9, an emitter 10 of a light beam 11 and an optical sensor 12. The sensor 12 may be either of the type able to measure the luminous intensity or of the type able to measure the time lapsing between emission and reception of the light beam, at a given wavelength of the emitted beam. The emitter 10 and the sensor 12 are also fixed to the rim 5 and are operationally connected to the tyre 1.

A portion 22 of the inner surface 4 of the tyre 1 has, applied to it, a reflecting element 14 having an ellipsoidal shape or any other suitable shape. The reflecting element 14 has a structure similar to that of the reflecting element 13. The emitter 10 and the sensor 12 are located opposite the reflecting element 14. This relative position is maintained in any rolling condition of the tyre and at any speed. The sensor 12, in the same way as the sensor 9, emits a signal (radio waves) which is transmitted remotely to the processor 15. The emitters 7 and 10 emit light beams 8 and 11, respectively, which are of known intensity and wavelength and which strike the reflecting element 13 and the reflecting element 14, respectively. The optical sensor 9 measures the luminous intensity of the reflected light beam, while the sensor 12 is able to measure either luminous intensity of the reflected light beam or the time lapsing between emission and reception of the light beam on the basis of the known wavelength. In this way, the sensor 12 measures the vertical distance present between reflecting element 14 and rim 5. In fact, when this distance varies, the inclination of the transmitted light beam and therefore the intensity of the reflected light beam received by the sensor 12 changes.

In the device 120, the longitudinal and transverse displacement signals measured by the sensor 9 are corrected by means of the signals emitted by the sensor 12 so as to take account of the fact that the dimensions of the spot analysed by the sensor 9 vary cyclically with the distance from the rim 5 owing to the compression which the tyre undergoes when entering into the area of contact with the ground and then leaving it. The distance varies between a value equal to the free radius of inflation and a value equal to the smaller free radius of compression.

The sensor 12 measures the intensity of the light beam reflected by the reflecting element 14, which varies depending on the distance travelled, and emits a signal representing the variation in distance. Alternatively, the sensor 12 measures the time lapsing between emission and reception and, on the basis of the known wavelength of the light beam, determines the variation in distance. The processor 15 uses the signal in order to update automatically and continuously the calibration setting of the sensor 9 and to determine the dimensions of the spot of the sensor 9, taking into account the variations in the abovementioned distance.

As a result, it is possible to obtain a correct measurement of the longitudinal and transverse displacements of the points considered on the surface 4, irrespective of the variation in the above-mentioned distance.

In the case where the sensor 9 emits a signal which is not influenced by the variation in distance between reflecting element and rim, it is advantageous to use the device 20 shown in FIG. 1. FIGS. 6, 7, 8 and 9 show the results obtained with the device according to the invention on a tyre of size 195/65 R15 and having an inflation pressure of 2 bar, a vertical load of 150 kg and a speed of 30 km/h.

Figure 6:
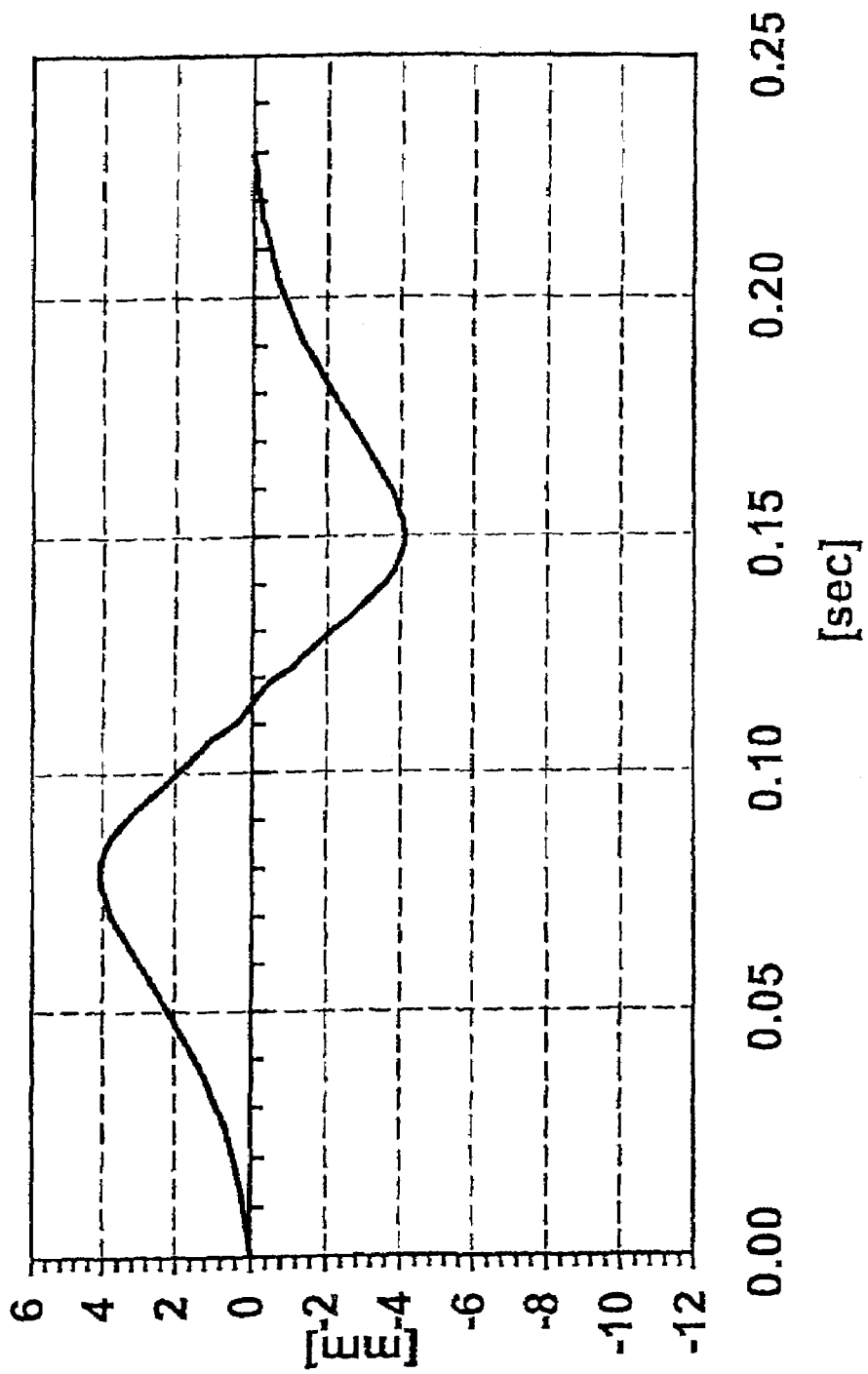
FIGS. 6, 7, 8 and 9 are graphs which show the pattern of displacements affecting a point on the surface portion of the tyre according to FIG. 1, to which the reflecting element according to FIG. 2 is applied.

FIG. 6 shows the pattern of the longitudinal displacements (mm), over time (sec), of a point on the liner, during free rolling conditions, in the zone of contact with the ground.

Figure 7:
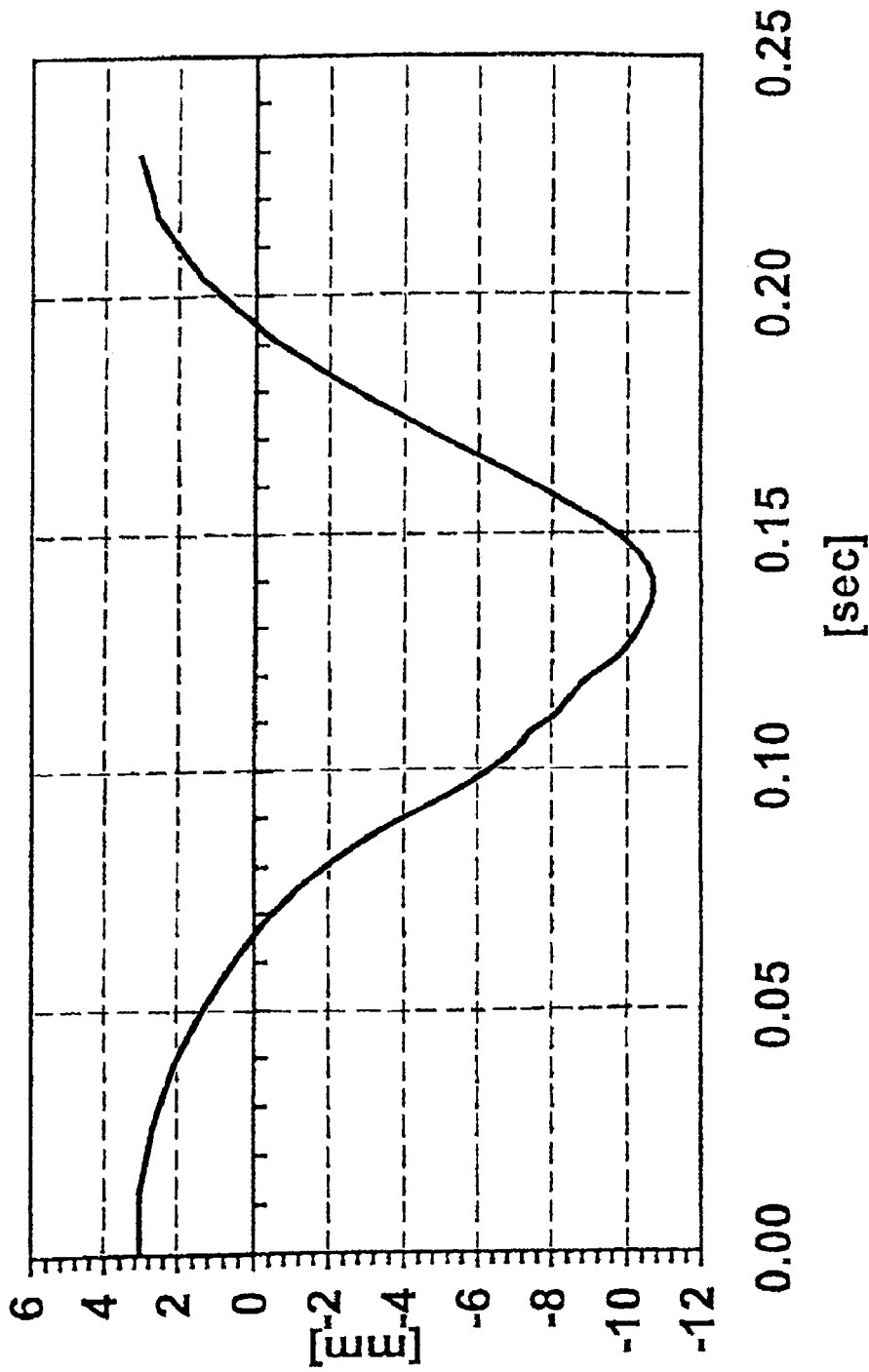

FIG. 7 shows the pattern of the longitudinal displacements (mm), over time (sec), of a point on the liner, during braking conditions, in the zone of contact with the ground. The braking manoeuvre was performed with a longitudinal force of 280 kg and skidding slip of 10%.

Figure 8:
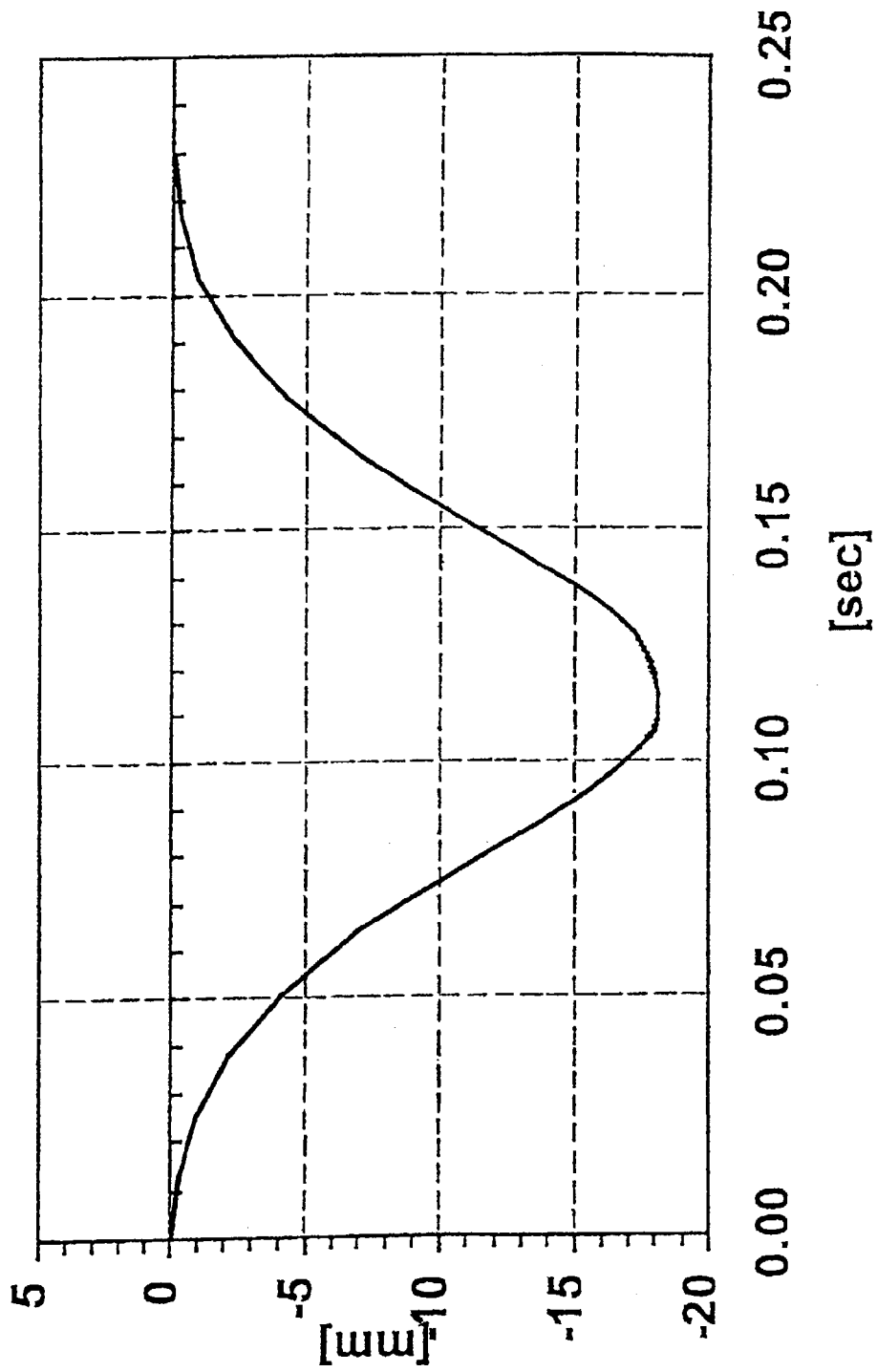

FIG. 8 shows the pattern of the lateral displacements (mm), over time (sec), of a point on the liner, during free rolling conditions, in the zone of contact with the ground, with a slip angle of 6 degrees.

Figure 9:
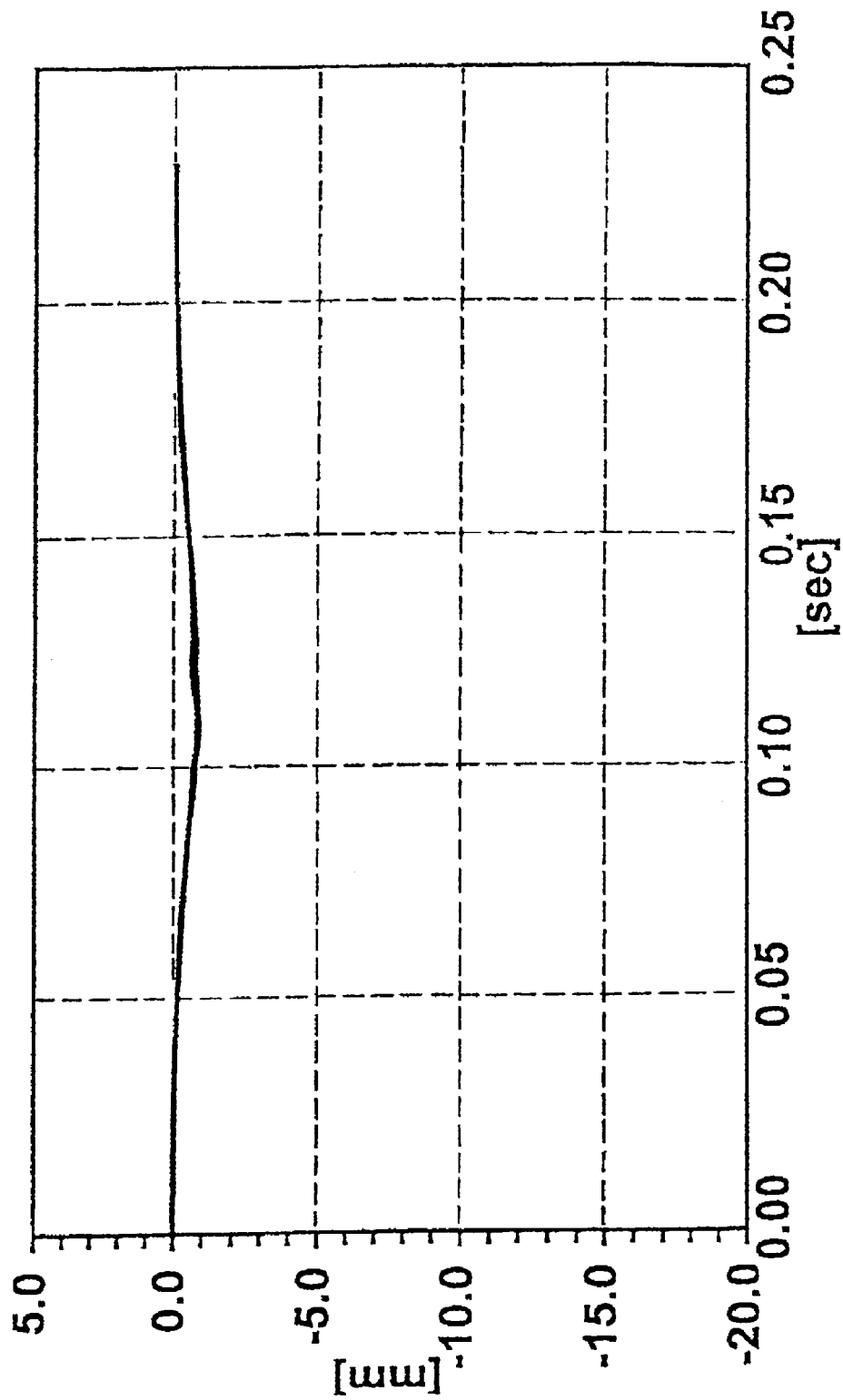

FIG. 9 shows the pattern of the lateral displacements (mm), over time (sec), of a point on the liner, during free rolling conditions, with a slip angle of 0 degrees.

The signal for the variation in distance is also used in the processor 15 to provide a measurement of the vertical compression of the tyre. By monitoring the four tyres of the motor vehicle it is possible to determine the type of manoeuvre in progress. The vertical compression of the tyres which are situated on the right-hand side or on the left-hand side of the motor vehicle provides information as to the type of bend, i.e. a right-hand or left-hand bend, which the vehicle is negotiating.

When the vehicle is travelling around a left-hand bend, a transfer of load takes place from the wheels situated on the left-hand side (on the inside of the bend) to the wheels situated on the right-hand side (on the outside of the bend). The tyres situated on the right-hand side tend to be compressed more, compared to travel in a straight line, while the left-hand tyres tend to be compressed less. Similarly, during braking, there is a transfer of load from the rear wheels to the front wheels. The vertical compression of the front tyres increases, compared to travel in a straight line. Conversely, during acceleration, the front wheels tend to be relieved of the load while the rear wheels are subject to a greater load. Therefore, the vertical compression of the rear tyres increases compared to travel in a straight line.

The processor 15, by means of the above-mentioned measurement of the variation in distance, determines the current vertical compression of the four tyres of the motor vehicle and compares it with the compression detected during travel in a straight line and when no manoeuvres are performed, so as to provide information as to the type of bend or the type of manoeuvre in progress.

What is claimed is:

1. A device for continuously measuring deformations in a tyre mounted on a rim, comprising:
    at least one emitter;
    at least one reflecting element; and
    at least one optical sensor;
    wherein the at least one emitter and the at least one optical sensor are disposed on the rim, wherein the at least one reflecting element is disposed on a first portion of an inner surface of the tyre,
    wherein the at least one emitter emits a light beam toward the at least one reflecting element, wherein the at least one reflecting element reflects the light beam toward the at least one optical sensor, and
    wherein the at least one optical sensor receives the reflected light beam, measures a first prechosen physical parameter associated with the reflected light beam, and provides a first signal representing a deformation of the tyre on the first portion of the inner surface of the tyre.

2. The device of claim 1, wherein the first prechosen physical parameter is a luminous intensity of the reflected light beam.

3. The device of claim 1, wherein the at least one optical sensor is operationally connected to a processor, and wherein the processor:
    determines, using the first signal, a displacement of at least one point on the first portion of the inner surface of the tyre in a predetermined direction; and provides an output signal representing the displacement of the at least one point on the first portion of the inner surface of the tyre in a predetermined direction.

4. The device of claim 1, further comprising:
a second emitter;
a second reflecting element; and
a second optical sensor;
wherein the second emitter and the second optical sensor are disposed on the rim, wherein the second reflecting element is disposed on a second portion of the inner surface of the tyre near the first portion of the inner surface of the tyre,
wherein the second emitter emits a second light beam toward the second reflecting element, wherein the second reflecting element reflects the second light beam toward the second optical sensor, and
wherein the second optical sensor receives the reflected second light beam, measures a second prechosen physical parameter associated with the reflected second light beam, and provides a second signal representing a variation in distance between the second portion of the inner surface of the tyre and the rim.

5. The device of claim 4, wherein the second prechosen physical parameter is a luminous intensity of the reflected second light beam.

6. The device of claim 4, wherein the second prechosen physical parameter is a time difference between the second emitter emitting the second light beam and the second optical sensor receiving the reflected second light beam, and wherein the second light beam has a given wavelength.

7. The device of claim 4, wherein the optical sensors are operationally connected to one or more processors, and wherein the one or more processors:
determine, using the first signal, a displacement of at least one point on the first portion of the inner surface of the tyre in a predetermined direction;
correct the displacement depending on the second signal; and
provide an output signal representing the corrected displacement of the at least one point on the first portion of the inner surface of the tyre in a predetermined direction.

8. The device of claim 7, wherein the one or more processors provide a measurement of a vertical compression of the tyre based on the second signal.

9. A motor vehicle wheel, comprising:
a tyre mounted on a rim; and
a device for continuously measuring deformations in the tyre;
where the device comprises:
at least one emitter;
at least one reflecting element; and
at least one optical sensor;
wherein the at least one emitter and the at least one optical sensor are disposed on the rim, wherein the at least one reflecting element is disposed on a first portion of an inner surface of the tyre,
wherein the at least one emitter emits a light beam toward the at least one reflecting element, wherein the at least one reflecting element reflects the light beam toward the at least one optical sensor, and
wherein the at least one optical sensor receives the reflected light beam, measures a first prechosen physical parameter associated with the reflected light beam, and provides a first signal representing a deformation of the tyre on the first portion of the inner surface of the tyre.

10. The motor vehicle wheel of claim 9, wherein the first prechosen physical parameter is a luminous intensity of the reflected light beam.

11. The motor vehicle wheel of claim 9, wherein the at least one optical sensor is operationally connected to a processor, and wherein the processor:
determines, using the first signal, a displacement of at least one point on the first portion of the inner surface of the tyre in a predetermined direction; and
provides an output signal representing the displacement of the at least one point on the first portion of the inner surface of the tyre in a predetermined direction.

12. The motor vehicle wheel of claim 9, wherein the device further comprises:
a second emitter;
a second reflecting element; and
a second optical sensor;
wherein the second emitter and the second optical sensor are disposed on the rim, wherein the second reflecting element is disposed on a second portion of the inner surface of the tyre near the first portion of the inner surface of the tyre,
wherein the second emitter emits a second light beam toward the second reflecting element, wherein the second reflecting element reflects the second light beam toward the second optical sensor, and
wherein the second optical sensor receives the reflected second light beam, measures a second prechosen physical parameter associated with the reflected second light beam, and provides a second signal representing a variation in distance between the second portion of the inner surface of the tyre and the rim.

13. The motor vehicle wheel of claim 12, wherein the second prechosen physical parameter is a luminous intensity of the reflected second light beam.

14. The motor vehicle wheel of claim 12, wherein the second prechosen physical parameter is a time difference between the second emitter emitting the second light beam and the second optical sensor receiving the reflected second light beam, and
wherein the second light beam has a given wavelength.

15. The motor vehicle wheel of claim 12, wherein the optical sensors are operationally connected to one or more processors, and wherein the one or more processors:
determine, using the first signal, a displacement of at least one point on the first portion of the inner surface of the tyre in a predetermined direction;
correct the displacement depending on the second signal; and
provide an output signal representing the corrected displacement of the at least one point on the first portion of the inner surface of the tyre in a predetermined direction.

16. The motor vehicle wheel of claim 15, wherein the one or more processors provide a measurement of a vertical compression of the tyre based on the second signal.

* * * * *